(12) United States Patent
Tanigawa et al.

(10) Patent No.: US 9,796,128 B2
(45) Date of Patent: Oct. 24, 2017

(54) FILAMENT WINDING DEVICE

(71) Applicants: Murata Machinery, Ltd., Kyoto-shi, Kyoto (JP); Toyota Jidosha Kabushiki Kaisha, Toyota-shi, Aichi (JP)

(72) Inventors: Motohiro Tanigawa, Kyoto (JP); Tadashi Uozumi, Kyoto (JP); Daigoro Nakamura, Kyoto (JP); Ken Hatta, Okazaki (JP)

(73) Assignees: MURATA MACHINERY, LTD., Kyoto (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 255 days.

(21) Appl. No.: 14/436,061

(22) PCT Filed: Oct. 15, 2013

(86) PCT No.: PCT/JP2013/078004
§ 371 (c)(1),
(2) Date: Apr. 15, 2015

(87) PCT Pub. No.: WO2014/061673
PCT Pub. Date: Apr. 24, 2014

(65) Prior Publication Data
US 2015/0266232 A1    Sep. 24, 2015

(30) Foreign Application Priority Data

Oct. 16, 2012 (JP) .................. 2012-229341

(51) Int. Cl.
*B65H 63/00* (2006.01)
*B29C 53/60* (2006.01)
(Continued)

(52) U.S. Cl.
CPC ........ *B29C 53/602* (2013.01); *B29C 53/8016* (2013.01); *B65H 59/32* (2013.01);
(Continued)

(58) Field of Classification Search
CPC .............. B29C 53/602; B29C 53/8016; B29C 53/8025; B65H 59/32; B65H 59/34; B65H 63/061
See application file for complete search history.

(56) References Cited

U.S. PATENT DOCUMENTS

2005/0077643 A1*  4/2005  Matsuoka ................ F16J 12/00
                                                                  264/103
2009/0126875 A1   5/2009  Uozumi et al.
(Continued)

FOREIGN PATENT DOCUMENTS

CN    202214088 U    5/2012
JP    2004209923 A   7/2004
(Continued)

OTHER PUBLICATIONS

International Preliminary Reporting on Patentability dated Apr. 21, 2015 issued on counterpart PCT application PCT/JP2013/078004.
(Continued)

*Primary Examiner* — Emmanuel M Marcelo
(74) *Attorney, Agent, or Firm* — DLA Piper LLP (US)

(57) ABSTRACT

With regard to a filament winding device in which a plurality of fiber bundles are simultaneously wound around a liner, a tension detecting portion and a tension adjusting portion are miniaturized, the cost of the tension detecting portion and the tension adjusting portion is reduced, and the tension detecting portion and the tension adjusting portion are easily arranged. Provided is a filament winding device 100 that includes a tension adjusting portion 110 that collectively adjusts tension of a plurality of fiber bundles F unreeled from a plurality of bobbins B and an unreeling failure detecting portion 130 that individually detects the unreeling failure of the fiber bundles F on the bobbins B for each bobbin B.

8 Claims, 11 Drawing Sheets

(51) Int. Cl.
  *B29C 53/80* (2006.01)
  *B65H 59/32* (2006.01)
  *B65H 63/06* (2006.01)

(52) U.S. Cl.
  CPC .... *B65H 63/061* (2013.01); *B29C 2053/8025* (2013.01); *B65H 2701/31* (2013.01)

(56) References Cited

U.S. PATENT DOCUMENTS

| | | | | |
|---|---|---|---|---|
| 2009/0127373 A1* | 5/2009 | Uozumi | ................ | B29C 53/602 242/436 |
| 2009/0314872 A1* | 12/2009 | Uozumi | .............. | B29C 53/8016 242/410 |
| 2010/0025412 A1* | 2/2010 | Wakao | ................ | B29C 53/8083 220/590 |
| 2013/0256447 A1 | 10/2013 | Tanigawa et al. | | |

FOREIGN PATENT DOCUMENTS

| | | |
|---|---|---|
| JP | 4403522 B2 | 11/2009 |
| JP | 2010006025 A | 1/2010 |
| JP | 2010023481 A | 2/2010 |
| JP | 2010126297 A | 6/2010 |
| JP | 2011245780 A | 12/2011 |
| WO | 2012066851 A1 | 5/2012 |

OTHER PUBLICATIONS

Written Opinion of the International Searching Authority dated Jan. 21, 2014 issued on counterpart PCT application PCT/JP2013/078004.

* cited by examiner

FILAMENT WINDING DEVICE

TECHNICAL FIELD

The present invention relates to a technology of a filament winding device.

BACKGROUND ART

Conventionally, there have been known filament winding devices (hereinafter appropriately referred to as "FW device") that include a fiber bundle head that allows a plurality of fiber bundles supplied from a plurality of bobbins to face the outer circumference of a liner and manufacture pressure containers and the like in a manner that the fiber bundle head and the liner are relatively rotated, centering on the axis of the liner, thereby simultaneously winding the plurality of fiber bundles on the liner.

For example, Patent Literature 1 discloses the FW device that includes a hoop winding head in which hoop winding is simultaneously applied to a small number (for example, four or eight) of fiber bundles around the liner, and a helical winding head in which helical winding is simultaneously applied to a multitude (for example, 180) of fiber bundles, as the FW device that can concurrently satisfy the improvement in terms of the performance of pressure resistance of the pressure container and the improvement of production efficiency.

In the FW device, the plurality of fiber bundles are wound around the liner in a state where predetermined tension is applied to the plurality of fiber bundles. When the tension applied to the fiber bundles is varied, or the tension between the fiber bundles is not uniform, there is a case where the winding failure of the fiber bundles on the liner occurs. The disparity in the tension of the fiber bundles, for example, is caused by the unreeling failure of the fiber bundles on the bobbins and the like.

Patent Literature 2 discloses the FW device in which a tension sensor is provided at a fiber guiding portion between the bobbins and the liner, and the value and direction of the tension of the fiber bundles are detected, and the position of the axial direction of the bobbin or a tension adjusting roller is controlled based on the detection results, thereby reducing the winding failure.

Patent Literature 3 discloses the FW device in which a tension sensor is provided between the bobbins and the liner, and a tension adjusting portion is controlled based on the detection results, thereby reducing the winding failure.

CITATION LIST

Patent Literature

PTL 1: Japanese Patent No. 4403522
PTL 2: Japanese Unexamined Patent Application Publication No. 2010-126297
PTL 3: Japanese Unexamined Patent Application Publication No. 2010-6025

SUMMARY OF INVENTION

Technical Problem

Both technologies disclosed by Patent Literatures 2 and 3 represent the constitution in which the tension detecting portion and the tension adjusting portion are individually provided with respect to each of the plurality of fiber bundles supplied from the bobbins.

It is possible to provide the tension detecting portion and the tension adjusting portion disclosed by Patent Literatures 2 and 3 with the FW device disclosed by Patent Literature 1. However, in the case of the above-mentioned example, it is necessary to provide the tension detecting portions and the tension adjusting portions, whose number is the same as that of fiber bundles, on the yarn paths of the fiber bundles, with the helical winding head in which the helical winding is simultaneously applied to a multitude (for example, 180) of fiber bundles, which increases the cost of the tension detecting portions and the tension adjusting portions and makes it difficult to arrange the tension detecting portions and the tension adjusting portions. Furthermore, the control of the tension of the fiber bundles is exceedingly complicated, which is not practical.

Also, the tension adjusting portion is a device that applies the tension to the fiber bundles, so that the tension of the fiber bundles is increased on the downstream side of the tension adjusting portion. When the tension adjusting portion is arranged on the upstream side with respect to the supply direction of the fiber bundles, and the tension detecting portion is arranged on the downstream side, it is difficult to detect the variation of low tension due to the unreeling failure on the bobbins, and it is difficult to detect the unreeling failure on the bobbins with high accuracy.

The present invention has been achieved to solve the above-mentioned problems. It is a first object of the present invention to miniaturize a tension detecting portion and a tension adjusting portion with regard to a FW device in which a plurality of fiber bundles are simultaneously wound around a liner, reduce the cost of the tension detecting portion and the tension adjusting portion, and arrange the tension detecting portion and the tension adjusting portion in an easy manner. It is a second object of the present invention to easily control the tension of the plurality of fiber bundles. It is a third object of the present invention to detect the unreeling failure of the fiber bundles on the bobbins with high accuracy.

Solution to Problem

The problems to be solved by the present invention have been described above. Subsequently, the means of solving the problems will be described below.

That is, a filament winding device of a first invention may include a fiber bundle head that allows a plurality of fiber bundles supplied from a plurality of bobbins to face an outer circumference of a liner, and the filament winding device is configured to simultaneously wind the plurality of fiber bundles on the liner by relatively rotating the fiber bundle head and the liner, centering on an axis of the liner and configured to include a tension adjusting portion and an unreeling failure detecting portion. The tension adjusting portion may collectively adjust tension of the plurality of fiber bundles unreeled from the plurality of bobbins. The unreeling failure detecting portion may individually detect unreeling failure of the fiber bundles on the bobbins for each bobbin.

According to the filament winding device of the first invention, a filament winding device of a second invention may be such that the unreeling failure detecting portion is configured to be provided on a yarn path between the tension adjusting portion and the plurality of bobbins.

According to the filament winding device of any one of the first or second invention, a filament winding device of a third invention may include a tension detecting portion configured to be provided between the liner and the tension adjusting portion and configured to detect the tension of the plurality of fiber bundles. The tension adjusting portion may collectively adjust the tension of the plurality of fiber bundles in accordance with the detection result of the tension detecting portion.

According to the filament winding device of any one of the first to third inventions, a filament winding device of a fourth invention may be such that the fiber bundle head is a helical winding head installed around the outer circumference of the liner, and the liner transfers in an axial direction while rotating about an axis thereof, thereby simultaneously winding the plurality of fiber bundles supplied from the bobbins on the liner.

According to the filament winding device of any one the first to fourth inventions, a filament winding device of a fifth invention may be such that the fiber bundle head is a hoop winding head rotatably installed around the outer circumference of the liner, and that the hoop winding head transfers in the axial direction while rotating about the axis of the liner, thereby simultaneously winding the plurality of fiber bundles supplied from the bobbins on the liner.

According to the filament winding device of any one of the first to fifth inventions, a filament winding device of a sixth invention may be such that the unreeling failure detecting portions are configured to be individually provided in accordance with the plurality of bobbins and configured to include a detection piece that changes from a standby position to a detection position, upon reception of the tension of the fiber bundle unreeled, and a detection portion configured to detect that the detection piece is positioned at the detection position.

According to the filament winding device of the sixth invention, a filament winding device of a seventh invention may be such that the detection piece is biased by a spring and positioned at the standby position.

According to the filament winding device of any one of the sixth or seventh invention, a filament winding device of a eighth invention may be such that the detection portion is a laser distance sensor that can measure a distance to a light-shielding position.

According to the filament winding device of any one of the sixth or seventh invention, a filament winding device of a ninth invention may be such that the detection portion is a photoelectric sensor that is individually provided in accordance with each detection piece.

Advantageous Effects of Invention

The present invention provides the following advantageous effects.

According to the aspect of the filament winding device of the first invention, the tension adjusting portion configured to collectively adjust the tension of the plurality of fiber bundles unreeled from the plurality of bobbins and the unreeling failure detecting portion configured to individually detect unreeling failure on the bobbins for each bobbin are provided. Accordingly, the tension adjusting portion and the unreeling failure detecting portion can be miniaturized, and the cost of the tension adjusting portion and the unreeling failure detecting portion can be reduced, and the tension adjusting portion and the unreeling failure detecting portion can be easily arranged. Also, the tension adjusting portion can collectively adjust the tension of the plurality of fiber bundles, so that the control of the tension of the plurality of fiber bundles can be easily made.

According to the aspect of the filament winding device of the second present invention, the unreeling failure detecting portion is provided on the yarn path between the tension adjusting portion and the plurality of bobbins. The variation of the tension of the fiber bundles, which is detected by the first unreeling failure detecting portions, is attributed to the unreeling failure on the bobbins, and the variation of the tension due to the operational failure of the tension adjusting portion and the like is not included. Accordingly, the variation of the low tension due to the unreeling failure on the bobbins can be detected, and the unreeling failure on the bobbins can be detected with high accuracy.

According to the aspect of the filament winding device of the third present invention, the tension detecting portion that detects the tension of the plurality of fiber bundles is provided between the liner and the tension adjusting portion, and the tension adjusting portion collectively adjusts the tension of the plurality of fiber bundles in accordance with the detection result of the tension detecting portion. Accordingly, the control of the tension of the plurality of fiber bundles can be easily made.

According to the aspect of the filament winding device of the fourth present invention, the fiber bundle head is the helical winding head installed around the outer circumference of the liner, and the liner transfers in the axial direction while rotating about the axis thereof, thereby simultaneously winding the plurality of fiber bundles supplied from the bobbins on the liner. Accordingly, with respect to the filament winding device that includes the helical winding head, the tension adjusting portion and the unreeling failure detecting portion can be easily arranged.

According to the aspect of the filament winding device of the fifth present invention, the fiber bundle head is the hoop winding head rotatably installed around the outer circumference of the liner, and the hoop winding head transfers in the axial direction while rotating about the axis of the liner, thereby simultaneously winding the plurality of fiber bundles supplied from the bobbins on the liner. Accordingly, with respect to the filament winding device that includes the hoop winding head, the tension adjusting portion and the unreeling failure detecting portion can be easily arranged.

According to the aspect of the filament winding device of the sixth present invention, the unreeling failure detecting portions are individually provided in accordance with the plurality of bobbins and include the detection piece configured to change from the standby position to the detection position, upon reception of the tension of the fiber bundle unreeled, and the detection portion configured to detect that the detection piece is positioned at the detection position. Accordingly, the unreeling failure detecting portions can be constituted based on simple constitution, and the unreeling failure on the bobbins can be detected with high accuracy.

According to the aspect of the filament winding device of the seventh present invention, the detection piece of the unreeling failure detecting portion is biased by the spring and positioned at the standby position. Accordingly, with simple constitution, the unreeling failure on the bobbins can be detected with high accuracy.

According to the aspect of the filament winding device of the eighth present invention, the detection portion of the unreeling failure detecting portion is the laser distance sensor that can measure a distance to the light-shielding position. Accordingly, it is possible to determine on which bobbin the unreeling failure occurs.

According to the aspect of the filament winding device of the ninth present invention, the detection portion of the unreeling failure detecting portion is the photoelectric sensor that is individually provided in accordance with each detection piece. Accordingly, it is possible to steadily determine on which bobbin the unreeling failure occurs, or whether or not the unreeling failure occurs.

DESCRIPTION OF EMBODIMENTS

First Embodiment

Figure 1:
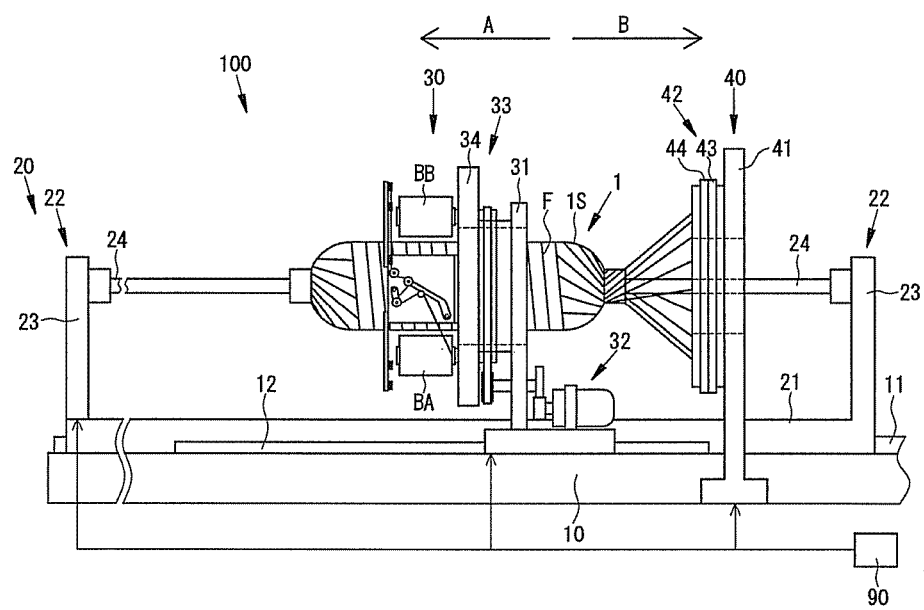
FIG. 1 is a side view of an FW device 100 according to the first embodiment of the present invention.

A filament winding device 100 (hereinafter referred to as "FW device 100") according to the first embodiment of the present invention will be described. As illustrated in FIG. 1, the FW device 100 is a device that winds a plurality of fiber bundles F, in which resin is impregnated, around the circumference of a liner 1, by repeatedly alternating hoop winding by use of a hoop winding device 30 with helical winding by use of a helical winding device 40 with respect to the liner 1. FIG. 1 illustrates a state where the hoop winding device 30 is disposed at a winding position.

Arrows A and B illustrated in FIG. 1 represent the back-and-front direction of the FW device 100 and the transfer direction of the liner 1 regarding the helical winding. In the helical winding, the liner 1 is reciprocated in the back-and-front direction of the FW device 100, so that there is a case where the liner 1 is transferred in the direction of the arrow A, and there is a case where the liner 1 is transferred in the direction of the arrow B. The direction in which the liner 1 is transferred is defined as a front side, and the side opposite to the front side is defined as a back side. Regarding the FW device 100, the liner 1 is reciprocated in the back-and-front direction, so that the front side and the back side are determined in accordance with the transfer direction of the liner 1.

The liner 1 is a hollow container formed of, for example, aluminum members having high intensity or polyamide resin and formed in an approximately cylindrical shape. Regarding the liner 1, the plurality of fiber bundles F are wound around an outer circumferential surface 1S, and a plurality of fiber layers are formed, thereby improving the performance of pressure resistance. That is, the liner 1 is of a base material constituting a pressure-resistant container. It is noted that, in the description below, the liner 1 means both a state before the fiber bundles F are wound and a state where the fiber bundles F are in the course of being wound. For example, the outer circumferential surface 1S of the liner 1 may mean the surface of the fiber bundles F wound.

Figure 2:
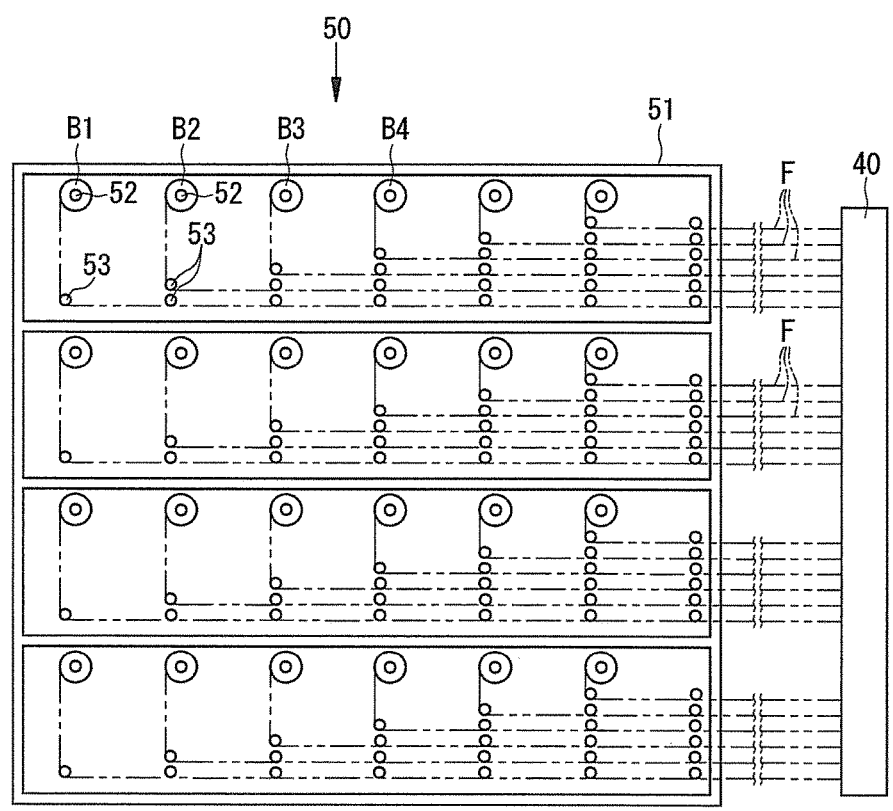
FIG. 2 is a side view of a creel stand 50.

As illustrated in FIGS. 1 and 2, the FW device 100 is mainly constituted by a main base 10, a liner transfer device 20, the hoop winding device 30, the helical winding device 40, a creel stand 50, and a controller 90.

The main base 10 constitutes the base of the FW device 100. A liner-transfer-device rail 11 is provided on the upper portion of the main base 10. The liner transfer device 20 is placed on the liner-transfer-device rail 11. A hoop-winding-device rail 12 is provided in parallel to the liner-transfer-device rail 11 on the upper portion of the main base 10. The hoop winding device 30 is placed on the hoop-winding-device rail 12.

With this constitution, the liner transfer device 20 and the hoop winding device 30 can be transferred with respect to the main base 10. The helical winding device 40 is fixed on the main base 10.

The liner transfer device 20 is a device that transfers the liner 1 while rotating the liner 1. The liner transfer device 20 rotates the liner 1 about the back-and-front direction of the FW device 100 as a central axis and transfers the liner 1 in the back-and-front direction of the FW device 100. The liner transfer device 20 is mainly constituted by a base 21 and a liner supporting portion 22. The drive of the liner transfer device 20 is controlled by the controller 90.

A pair of liner supporting portions 22 are provided on the upper portion of the base 21. The liner supporting portion 22 is constituted by a liner supporting frame 23 and a rotary shaft 24. The liner supporting frame 23 is extended upward from the base 21. The rotary shaft 24 is extended from the liner supporting frame 23 in the back-and-front direction. The liner 1 is mounted on the rotary shaft 24 and rotated in one direction by means of a power mechanism not illustrated.

With this constitution, the liner transfer device 20 rotates the liner 1 about the back-and-front direction of the FW device 100 as the central axis and allows the liner 1 to be transferred in the back-and-front direction of the FW device 100.

The hoop winding device 30 is a device that simultaneously winds the plurality of fiber bundles F around the outer circumferential surface 1S of the liner 1 and forms fiber layers. The hoop winding device 30 performs so-called hoop winding in which the winding angle of the fiber bundles F is positioned approximately vertical to the back-and-front direction of the FW device 100. The hoop winding device 30 is mainly constituted by a base 31, a power mechanism 32, and a hoop wrapping device 33. The drive of the hoop winding device 30 is controlled by the controller 90.

The hoop wrapping device 33 that is rotated by the power mechanism 32 is provided on the base 31. The hoop wrapping device 33 includes a wrapping table 34 as a fiber bundle head.

Figure 4:
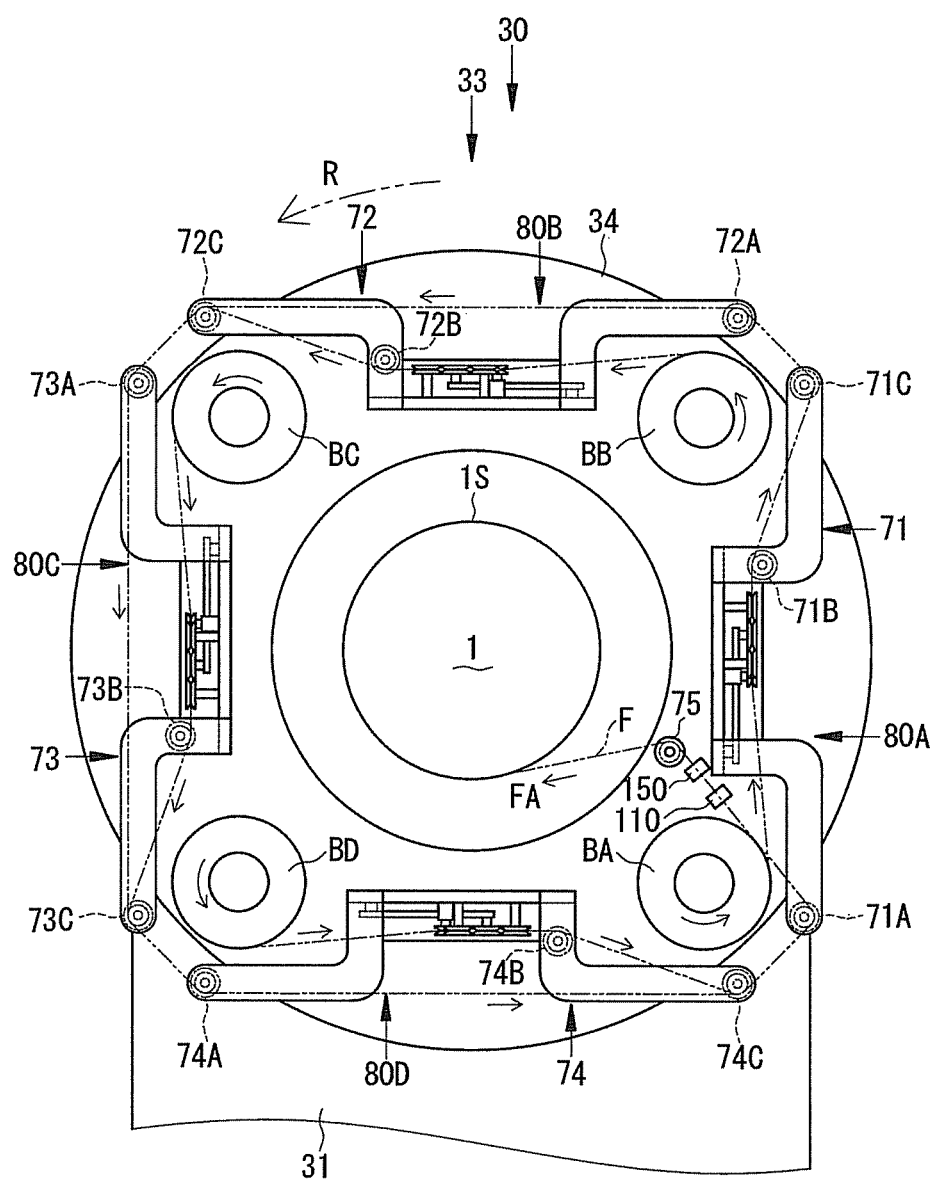
FIG. 4 is a front view of the hoop winding device 30.

A space through which the liner 1 penetrates is provided in the center of the wrapping table 34, and a plurality of bobbins (four in the present embodiment) BA, BB, BC, and BD are arranged in the periphery of the space (see FIG. 4). The respective fiber bundles F are supplied from the bobbins BA, BB, BC, and BD to the outer circumferential surface 1S of the liner 1. The power mechanism 32 rotates the hoop wrapping device 33 about the central axis of the liner 1.

Regarding the hoop winding, the position of the liner 1 is fixed, and the hoop winding device 30 is reciprocated along the direction of the central axis of the liner 1 while the hoop wrapping device 33 is rotated about the central axis of the liner 1. The hoop winding is performed in this manner. That is, the hoop winding device 30 includes the wrapping table 34 as the fiber bundle head that allows the fiber bundles F supplied from the bobbins BA, BB, BC, and BD to face the outer circumferential surface 1S of the liner 1, and the hoop winding device 30 is configured to simultaneously wind the plurality of fiber bundles F on the liner 1 by relatively rotating the wrapping table 34 and the liner 1, centering on the axis of the liner 1.

With this constitution, the hoop winding device 30 performs the hoop winding, in which the winding angle of the fiber bundles F is positioned approximately vertical to the back-and-front direction of the FW device 100, to the outer circumferential surface 1S of the liner 1. It is noted that the winding form of the fiber bundles F is freely changed by adjusting the transfer speed of the hoop winding device 30 or the rotational speed of the wrapping table 34.

The helical winding device 40 is a device that simultaneously winds the plurality of fiber bundles F on the outer circumferential surface 1S of the liner 1 and forms the fiber layers. The helical winding device 40 performs so-called helical winding in which the winding angle of the fiber bundles F corresponds to a predetermined value (for example, 0 to 60 degrees) with respect to the back-and-front direction of the FW device 100. The helical winding device 40 is mainly constituted by a base 41 and a helical wrapping device 42. The drive of the helical winding device 40 is controlled by the controller 90.

The helical wrapping device 42 is provided on the base 41. The helical wrapping device 42 includes a first helical head 43 and a second helical head 44. The plurality of fiber bundles F are supplied from a plurality of bobbins B1, B2, . . . B180 (180 bobbins in the present invention) supported by the creel stand 50 to the first helical head 43 and the second helical head 44, and the plurality of fiber bundles F are guided to the outer circumferential surface 1S of the liner 1. A plurality of nozzles (not illustrated) (each of 90 nozzles in the present invention) are radially provided in the first helical head 43 and the second helical head 44 with respect to the outer circumferential surface 1S of the liner 1. The plurality of fiber bundles F are guided by the plurality of nozzles to the outer circumferential surface 1S of the liner 1, and the helical winding is performed in concurrence with the passage and rotation of the liner 1. Regarding the helical winding, the helical winding device 40 is fixed, and the liner 1 is transferred by the liner transfer device 20 in the rotary axial direction while being rotated. Accordingly, the helical winding is performed in this manner. That is, the helical winding device 40 includes the first helical head 43 and the second helical head 44 as the fiber bundle head that allows the fiber bundles F supplied from the plurality of bobbins B1, B2, . . . and B180 to face the outer circumferential surface 1S of the liner 1, and the helical winding device 40 is configured to simultaneously wind the plurality of fiber bundles F on the liner 1 by relatively rotating the first helical head 43 and the second helical head 44, and the liner 1, centering on the axis of the liner 1.

With this constitution, the helical winding device 40 performs the helical winding, in which the winding angle of the fiber bundles F corresponds to a predetermined value with respect to the back-and-front direction of the FW device 100, on the outer circumferential surface 1S of the liner 1. It is noted that the winding form of the fiber bundles F is freely changed by adjusting the transfer speed or the rotational speed of the liner 1.

As illustrated in FIG. 2, the creel stand 50 supplies the plurality of fiber bundles F (180 in the present invention) to the plurality of nozzles (each of 90 in the present invention) provided in the first helical head 43 and the second helical head 44 of the helical winding device 40. The creel stand 50 is mainly constituted by a rack 51, bobbin holder shafts 52, and guides 53.

In the rack 51, a plurality of bobbin holder shafts 52 are mounted in parallel to each other. The bobbins B1, B2, . . . and B180 are supported on the bobbin holder shafts 52 in a freely rotatable manner. The bobbins B1, B2, . . . and B180 are rotated by drawing out the fiber bundles F, thereby unreeling the fiber bundles F. A plurality of guides 53 that guide the fiber bundles F are provided on the paths of the fiber bundles F advancing from each of the bobbins B1, B2, . . . and B180 to the liner 1. The plurality of fiber bundles F unreeled from each of the bobbins B1, B2, . . . and B180 are supplied to each nozzle of the corresponding helical winding device 40 via the plurality of guides 53.

With this constitution, the creel stand 50 can supply the plurality of fiber bundles F to the plurality of nozzles constituting the helical winding device 40. It is noted that the FW device 100 of the present embodiment includes a plurality of creel stands 50, which is similar to the creel stand 50 illustrated in FIG. 2, and is configured to supply the plurality of fiber bundles F from each creel stand 50 to the helical winding device 40.

Figure 3:
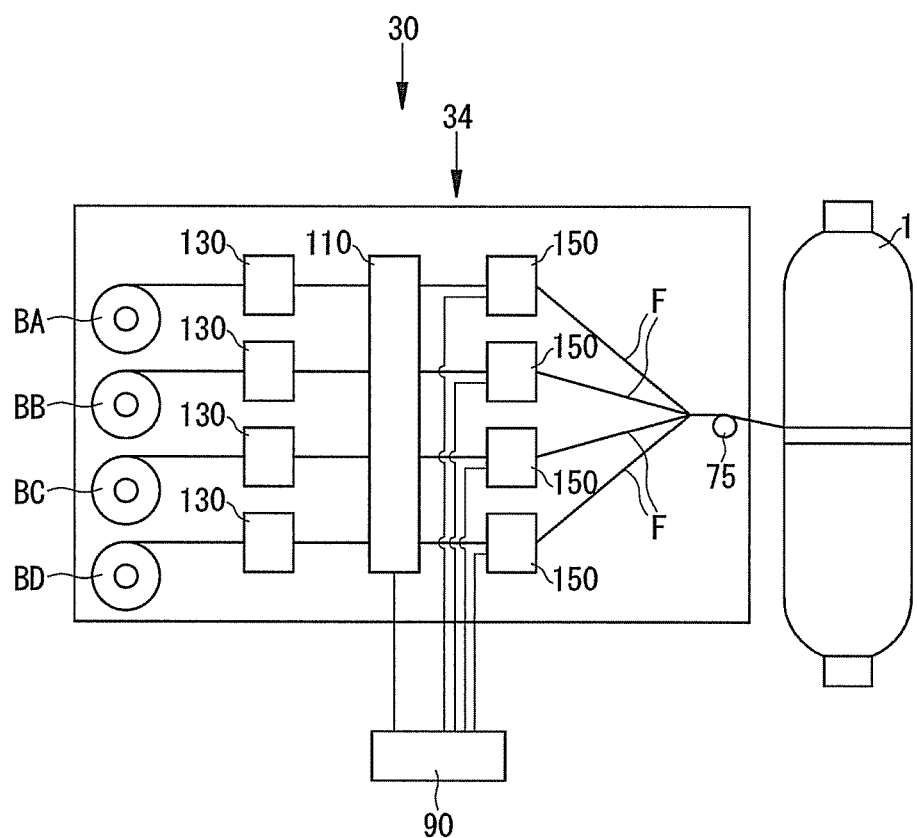
FIG. 3 is a view illustrating the schematic constitution of a first tension adjusting portion 110, a first unreeling failure detecting portion 130, and a first tension detecting portion 150, each of which is provided for a hoop winding device 30.

Next, as the features of the present embodiment, a first tension adjusting portion 110, a first unreeling failure detecting portion 130, and a first tension detecting portion 150, each of which is provided in the hoop winding device 30, will be described. First, the schematic constitution of these portions will be described referring to FIG. 3. As illustrated in FIG. 3, the first tension adjusting portion 110, the first unreeling failure detecting portions 130, and the first tension detecting portions 150 are arranged on the yarn paths leading from the plurality of bobbins BA, BB, BC, and BD to the liner 1 with regard to the wrapping table 34.

A unit of first tension adjusting portion 110 is provided for the plurality of fiber bundles F that are unreeled from the plurality of bobbins BA, BB, BC, and BD. The first tension adjusting portion 110 collectively adjusts the tension of the plurality of fiber bundles F. The first tension adjusting portion 110 is electrically connected to the controller 90, and the drive of the first tension adjusting portion 110 is controlled by the controller 90.

The first tension detecting portions 150 are provided between the liner 1 and the first tension adjusting portion 110. The first tension detecting portions 150 are individually arranged for the plurality of fiber bundles F. The first tension detecting portions 150 individually detect the tension of the plurality of fiber bundles F. The first tension detecting portions 150 detect the tension of each fiber bundle F and transmit a detection signal to the controller 90. The controller 90 controls the drive of the first tension adjusting portion 110 based on the detection signal from the first tension detecting portions 150. The first tension adjusting portion 110 collectively adjusts the tension of the plurality of fiber bundles F in accordance with the detection results of the first tension detecting portions 150.

The first unreeling failure detecting portions 130 individually detect the unreeling failure of the fiber bundles F on the plurality of bobbins BA, BB, BC, and BD for each of the bobbins BA, BB, BC, and BD. The first unreeling failure detecting portions 130 are provided on the yarn paths between the plurality of bobbins BA, BB, BC, and BD and the first tension adjusting portion 110.

Figure 5:
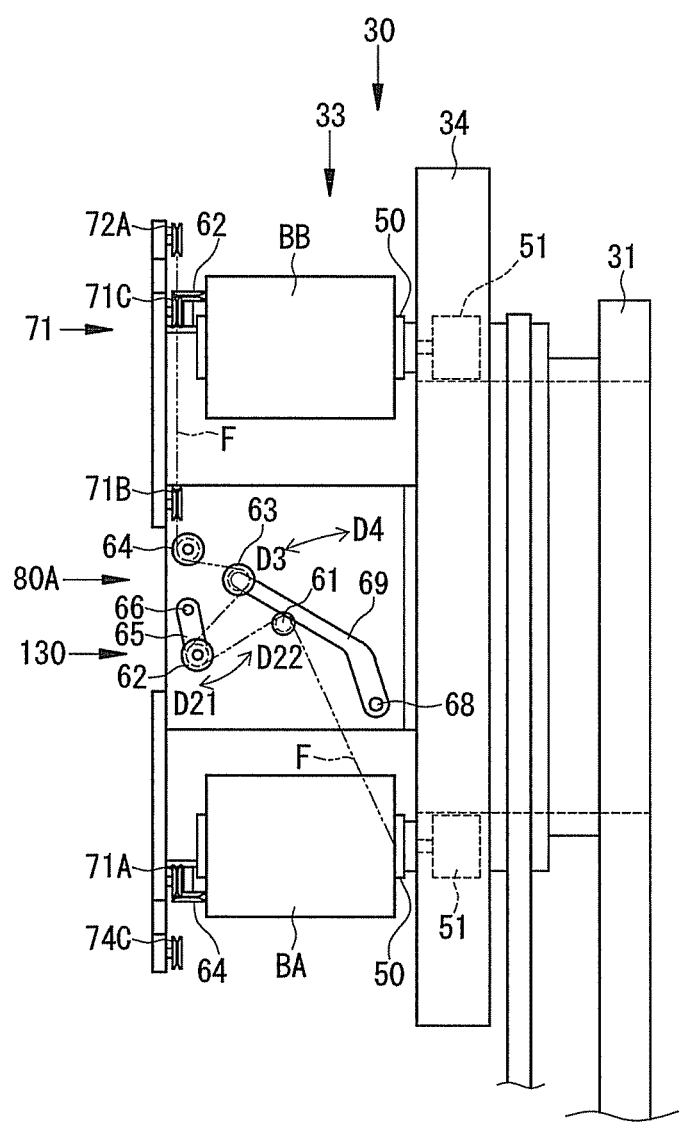
FIG. 5 is a side view of the hoop winding device 30.

Next, the specific constitution of the first tension adjusting portion 110, the first unreeling failure detecting portion 130, and the first tension detecting portion 150 will be described. As illustrated in FIGS. 4 and 5, bobbin supporting portions 50 are arranged at four places corresponding to the bobbins BA, BB, BC, and BD on the wrapping table 34 of the hoop winding device 30. Frames 80A, . . . and 80D are provided in the vicinity of each bobbin supporting portion 50. The constitution of the bobbin supporting portions 50 provided in accordance with the bobbins BA, BB, BC, and BD and the frames 80A, . . . and 80D is approximately the same. Hereinafter, the frame 80A will be mainly described.

The wrapping table 34 is rotated by the power mechanism 32 in the direction of an arrow R in FIG. 4. The power mechanism 32 is connected to the controller 90, and the rotation and stoppage of the power mechanism 32 are controlled based on the signals from the controller 90. The fiber bundles F guided from a fiber supply guide 75 to the liner 1 are rotated in the direction of the arrow R while being wound around the outer circumferential surface 1S of the liner 1. The fiber bundles F are supplied in the direction of an arrow FA by the rotation of the wrapping table 34.

The bobbin supporting portion 50 that supports the bobbin BA is supported in a freely rotatable manner with respect to the wrapping table 34 and coupled with a hysteresis brake 51 as a braking portion. The hysteresis brake 51 brakes the rotation of the bobbin BA supported by the bobbin supporting portion 50. The fiber bundle F is pulled in a state where the bobbin BA is supported by the bobbin supporting portion 50, whereby the bobbin BA is rotated, and the fiber bundle F is drawn out.

As illustrated in FIG. 4, the frames 80A, . . . and 80D respectively support guide rollers 71 (71A, 71B, and 71C) . . . and 74 (74A, 74B, and 74C). Four fiber bundles F from the bobbins BA, BB, BC, and BD supported by the bobbin supporting portions 50 are guided by the guide rollers 71 (71B, and 71C) . . . and 74 (74A, 74B, and 74C) and consolidated by the guide roller 74C and guided to the fiber supply guide 75 via the guide roller 71A. The fiber supply guide 75 supplies the four fiber bundles F consolidated to the outer circumferential surface 1S of the liner 1.

As illustrated in FIG. 4, the first tension adjusting portion 110 is provided in such a manner as to be interposed on the path of the fiber bundle F, leading from the guide roller 71A to the fiber supply guide 75. Also, the first tension detecting portion 150 is provided in such a manner as to be interposed on the path of the fiber bundle F, leading from the first tension adjusting portion 110 to the fiber supply guide 75.

Figure 6:
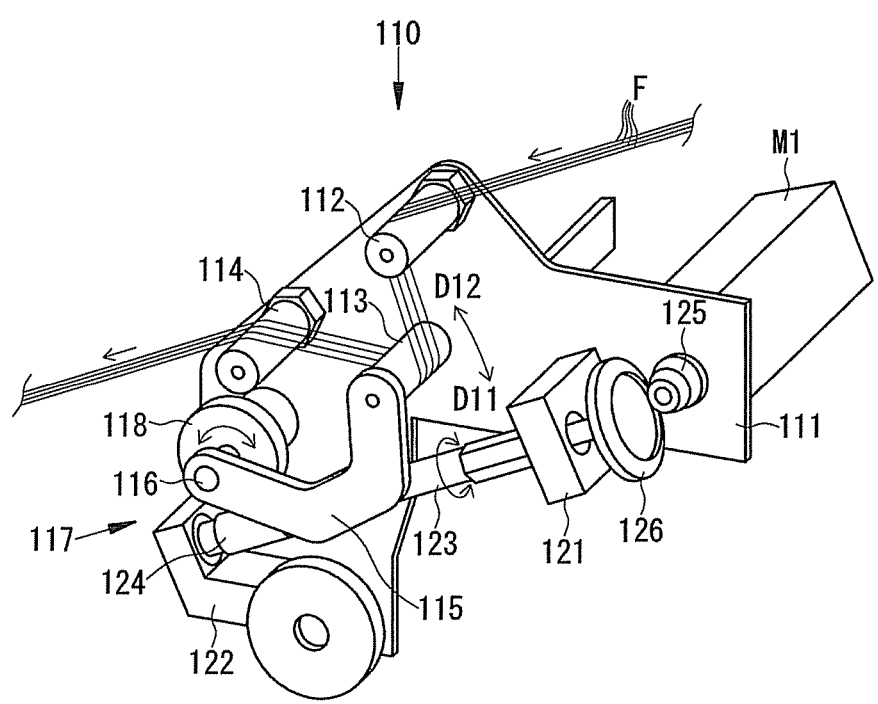
FIG. 6 is a perspective view of the first tension adjusting portion 110.

As illustrated in FIG. 6, the first tension adjusting portion 110 collectively adjusts the tension of the four fiber bundles F consolidated. The first tension adjusting portion 110 includes a frame 111 that serves as a base. A first shaft 112, a second shaft 113, and a third shaft 114 are provided in the frame 111. The fiber bundle F is wound around in order of the first shaft 112, the second shaft 113, and the third shaft 114. The first shaft 112 is a roller that receives the fiber bundle F guided from the side of the guide roller 71A. The third shaft 114 is a roller that forwards the fiber bundle F to the side of the fiber supply guide 75. The first shaft 112 and the third shaft 114 are supported by the frame 111.

The second shaft 113 is supported by one end portion of an arm 115. The other end portion of the arm 115 is provided on the frame 111 in such a manner as to be swingable in the direction of D11 and in the direction of D12, centering on a supporting shaft 116. The direction of D11 is the direction in which the second shaft 113 is separated away from the first shaft 112 and the third shaft 114. The direction of D12 is the direction in which the second shaft 113 comes close to the first shaft 112 and the third shaft 114. The arm 115 swings, which changes the paths of the fiber bundles F leading from the first shaft 112 to the third shaft 114, and the frictional force applied to the fiber bundles F is changed, thereby adjusting the tension of the fiber bundles F. When the second shaft 113 is transferred in the direction of D11, the tension applied to the fiber bundles F increases. When the second shaft 113 is transferred in the direction of D12, the tension applied to the fiber bundles F decreases.

A worm wheel 118 constituting a worm gear 117 is fixed on the supporting shaft 116. The worm wheel 118 is fixed on the supporting shaft 116 and integrated with the arm 115 in a freely rotatable manner.

A first supporting portion 121 and a second supporting portion 122, each of which rotatably supports a shaft 123, are provided on the frame 111. A worm 124 constituting the worm gear 117 is fixed on one end portion of the shaft 123. The worm gear 117 is constituted by engaging the worm 124 with the worm wheel 118.

A first motor M1 is provided in the frame 111. A servomotor is used as the first motor M1. A first bevel gear 125 is fixed on the driving shaft of the first motor M1. A second bevel gear 126 engaged with the first bevel gear 125 is fixed on the other end portion of the shaft 123. The first motor M1 is electrically connected to the controller 90, and the drive of the first motor M1 is controlled by the controller 90. The rotation angle of the first motor M1 is controlled by the controller 90, thereby changing the swing angle in the direction of D11 or in the direction of D12 of the arm 115 and adjusting the tension of the fiber bundles F.

It is noted that the tension of the fiber bundles F acts upon the second shaft 113, which causes the arm 115 to receive the rotating force in the direction of D12. This force is transmitted from the worm wheel 118 to the worm 124. However, in general, with regard to the worm gear, when the rotation force acts upon the side of the worm wheel, the worm exerts the effect of serving as a whirl-stop. Accordingly, in the present embodiment, the worm gear 117 is provided between the first motor M1 and the arm 115, which makes it unnecessary to separately provide the whirl-stop mechanism of the arm 115. Also, the rotation force from the arm 115 is not transmitted as a force that reverses the driving shaft of the first motor M1, so that a relatively small-size motor can be used as the first motor M1.

As illustrated in FIG. 3, the first tension detecting portions 150 are individually arranged for the plurality of fiber bundles F and individually detect the tension of each fiber bundle F. The first tension detecting portions 150 detect the tension of each fiber bundle F and transmit the detection signal to the controller 90. The controller 90 controls the drive of the first tension adjusting portion 110 based on the detection signal from the first tension detecting portions 150.

Specifically, when the tension of the fiber bundles F is lower than a predetermined value, the first tension detecting portions 150 transmit a detection signal to the effect that the tension is lower than the predetermined value, to the controller 90. In this case, the controller 90 controls the rotation angle of the first motor M1 based on the detection signal from the first tension detecting portions 150 in such a manner that the second shaft 113 provided in the arm 115 is transferred in the direction of D11, and that the tension of fiber bundles F increases. Also, when the tension of the fiber bundles F is higher than a predetermined value, the first tension detecting portions 150 transmit a detection signal to the effect that the tension is higher than the predetermined value, to the controller 90. In this case, the controller 90 controls the rotation angle of the first motor M1 based on the detection signal from the first tension detecting portions 150 in such a manner that the second shaft 113 provided in the arm 115 is transferred in the direction of D12, and that the tension of fiber bundles F decreases. With the above-mentioned constitution, the first tension adjusting portion 110 can collectively adjust the tension of the plurality of fiber bundles F in accordance with the detection result of the first tension detecting portions 150.

Figure 7:
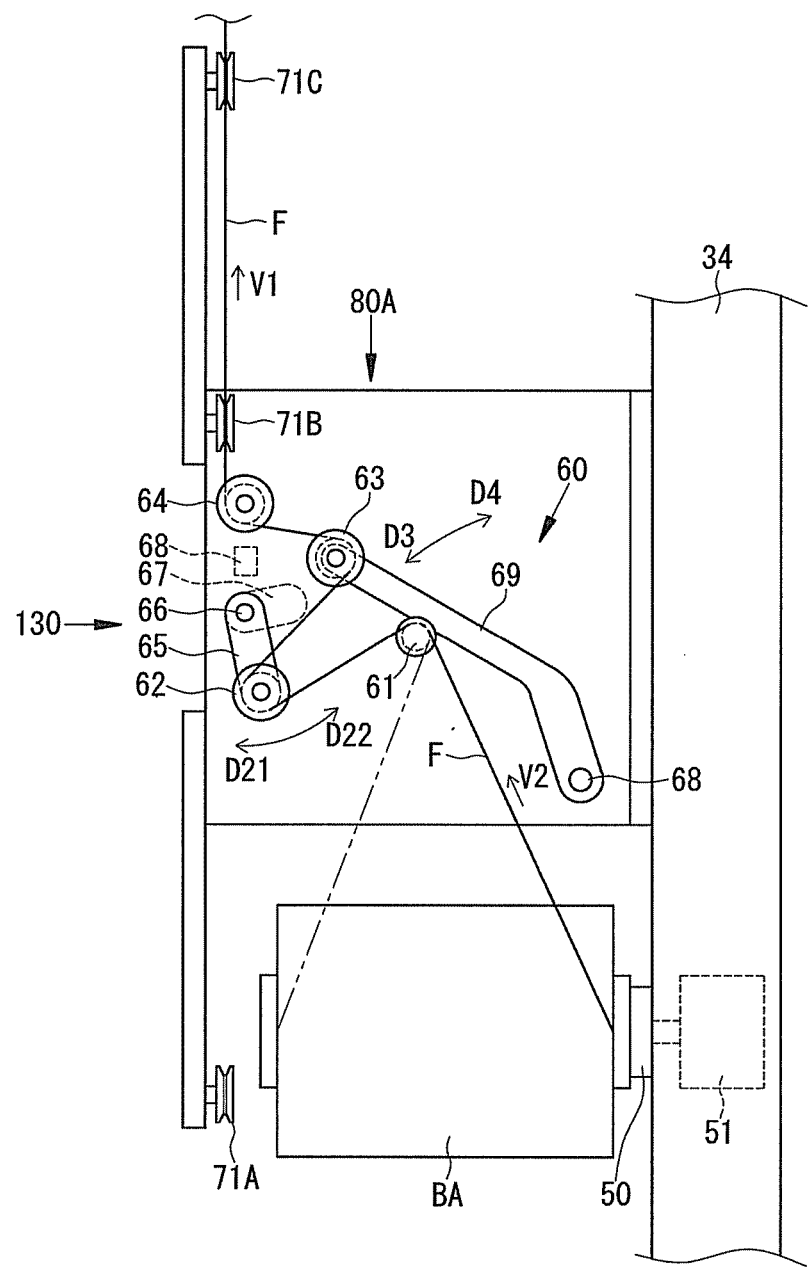
FIG. 7 is a front view of a frame 80A and the first unreeling failure detecting portion 130.

As illustrated in FIGS. 4, 5, and 7, the respective first unreeling failure detecting portions 130 are provided in the frames 80A, 80B, 80C, and 80D. The respective first unreeling failure detecting portions 130 provided in the frames 80A, 80B, 80C, and 80D are provided in such a manner as to be interposed on the paths of the fiber bundles F leading from the bobbins BA, BB, BC, and BD to first guide rollers 71B, 72B, 73B, and 74B. The respective first unreeling failure detecting portions 130 corresponding to the bobbins BA, BB, BC, and BD have approximately the same constitution, and hereinafter, the first unreeling failure detecting portion 130 corresponding to the bobbin BA will be mainly described.

As illustrated in FIG. 7, the first unreeling failure detecting portion 130 includes a second roller 62. A first roller 61, a third roller 63, and a fourth roller 64, other than the second roller 62, are provided in the frame 80A. The fiber bundle F is wound around in order of the first roller 61, the second roller 62, the third roller 63, and the fourth roller 64. The first roller 61 is a roller that serves as a fulcrum of the fiber bundle F unreeled from the bobbin BA. The fourth roller 64 is a roller that guides the fiber bundle F to the guide roller 71B. The third roller 63 is supported by the arm 69 and constitutes a take-up portion 60 for the fiber bundle F. The first roller 61 and the fourth roller 64 are supported by the frame 80A.

It is noted that the arm 69 constituting the take-up portion 60 is supported in such a manner as to be swingable in the directions of D3 and D4 and biased by a torsional spring not illustrated in the direction of D4. When the tension of the fiber bundle F is equal to or higher than a set value, the arm 69 rotates to a position, at which the arm 69 is abutted with the supporting portion of the first roller 61, and is on standby. When the tension of the fiber bundle F is less than the set value, which causes looseness, the arm 69 rotates in the direction of D4 by means of biased force of the torsional spring and absorbs the looseness generated in the fiber bundle F.

The second roller 62 constituting the first unreeling failure detecting portion 130 is supported by one end portion of an arm 65. The other end portion of the arm 65 is provided on the frame 80A in such a manner as to be swingable in the directions D21 and D22, centering on a supporting shaft 66. The direction D21 is the direction in which the second roller 62 is separated away from the fourth roller 64. The direction D22 is the direction in which the second roller 62 comes close to the fourth roller 64. That is, the arm 65 swings, thereby increasing and decreasing the length of the path of the fiber bundle F between the second roller 62 and the fourth roller 64.

The supporting shaft 66 penetrates the frame 80A up to the back surface side (the back side of the page), and the second roller 62 is biased by the torsional spring (not illustrated) provided in the supporting shaft 66 in the direction (the direction of D21) in which the second roller 62 is separated away from the fourth roller 64. It is noted that an imaginary plane on which the arm 65 swings is provided in parallel to the rotary shaft of the wrapping table 34. Accordingly, the influence of the centrifugal force on the arm 65, which is attributed to the rotation of the wrapping table 34, is minimized.

A first detection piece 67 is fixed on the supporting shaft 66 that supports the arm 65 on the back surface side (the back side of the page) of the frame 80A. The first detection piece 67 swings in response to the swing of the arm 65. A first detection portion 68 is provided on the back surface side (the back side of the page) of the frame 80A.

When the predetermined tension is applied to the fiber bundle F, that is, when the unreeling of the fiber bundle F on the bobbin BA is normal, the second roller 62 is biased by the biased force of the torsional spring provided in the supporting shaft 66 of the arm 65, and the arm 65 is rotated in the direction of D21 and rotated in the direction in which the arm 65 is separated away from the fourth roller 64 (standby position). When the tension applied to the fiber bundle F is increased, compared with the predetermined tension, that is, when there occurs abnormality in unreeling the fiber bundle F on the bobbin BA, the second roller 62 is pressed against the biased force of the torsional spring provided in the supporting shaft 66 of the arm 65, and the arm 65 is rotated in the direction of D22 and rotated in the direction in which the arm 65 comes close to the fourth roller 64 (detection position).

The first detection portion 68 detects the first detection piece 67 in a state where the arm 65 rotates to the detection position, thereby detecting that the arm 65 is rotated to a predetermined position. Also, the first detection portion 68 does not detect the first detection piece 67 in a state where the arm 65 does not rotate to the detection position, thereby detecting that the arm 65 is not rotated to the predetermined position. That is, the first detection portion 68 detects that the unreeling of the fiber bundle F on the bobbin BA is normal, and the predetermined tension is applied to the fiber bundle F, and detects that the failure occurs in unreeling the fiber bundle F on the bobbin BA, and the tension applied to the fiber bundle F is being increased.

When the first detection portion 68 detects that the failure occurs in unreeling the fiber bundle F on the bobbin BA, the first detection portion 68 transmits the detection signal to the effect that the failure occurs, to the controller 90. Also, when the first detection portion 68 detects that the unreeling of the fiber bundle F on the bobbin BA is normal, the first detection portion 68 transmits the detection signal to the effect that the unreeling is normal, to the controller 90. As the first detection portion 68, known sensors such as a photoelectric sensor can be used. Electric power required for the first detection portion 68 may be supplied from outside of the wrapping table 34, or a battery may be mounted on the wrapping table 34, and the electric power is supplied from the battery.

When the first detection portion 68 detects that the failure occurs in unreeling the fiber bundle F on the bobbin BA, the controller 90 generates an alarm sound or the like by means of a notification portion not illustrated, based on the detection signal from the first detection portion 68. It is noted that there is a case where, even when the failure does not occur in unreeling the fiber bundle F on the bobbin BA, the tension applied to the fiber bundle F is temporarily increased due to an increase in the winding velocity V1 of the fiber bundle F immediately after the hoop winding device 30 starts winding the fiber bundle F. In this case, it is not necessary to exert the alarm sound or the like. Accordingly, the controller 90 does not exert the alarm sound or the like when a duration time of an abnormality detection signal from the first detection portion 68 is equal to or less than a set time. Also, even when the duration time of the abnormality detection signal from the first detection portion 68 is equal to or less than a set time, but when the abnormality detection signals are received at a predetermined frequency or higher, the controller 90 determines that some abnormality occurs and exerts the alarm sound or the like.

The above-mentioned FW device 100 according to the present embodiment has the following advantageous effects.

The FW device 100 includes the first tension adjusting portion 110 that collectively adjusts the tension of the plurality of fiber bundles F unreeled from the plurality of bobbins BA, BB, BC, and BD and the first unreeling failure detecting portions 130 that individually detect the unreeling failure for each of the bobbins BA, BB, BC, and BD. Accordingly, the first tension adjusting portion 110 and the first unreeling failure detecting portions 130 are miniaturized, and the cost of the first tension adjusting portion 110 and the first unreeling failure detecting portions 130 can be reduced, and the first tension adjusting portion 110 and the first unreeling failure detecting portions 130 can be easily arranged. Also, the first tension adjusting portion 110 can collectively adjust the tension of the plurality of fiber bundles F, so that the control of the tension of the plurality of fiber bundles F can be easily made.

The first unreeling failure detecting portions 130 of the FW device 100 are provided on the yarn paths between the first tension adjusting portion 110 and the plurality of bobbins BA, BB, BC, and BD. The variation of the tension of the fiber bundles F, which is detected by the first unreeling failure detecting portions 130, is attributed to the unreeling failure on the bobbins BA, BB, BC, and BD, and the variation of the tension due to the operational failure of the first tension adjusting portion 110 and the like is not included. Accordingly, the variation of the low tension due to the unreeling failure on the bobbins BA, BB, BC, and BD can be detected, and the unreeling failure on the bobbins BA, BB, BC, and BD can be detected with high accuracy.

Regarding the FW device 100, the first tension detecting portions 150 that detect the tension of the plurality of fiber bundles F are provided between the liner 1 and the first tension adjusting portion 110, and the first tension adjusting portion 110 collectively adjusts the tension of the plurality of fiber bundles F in accordance with the detection results of the first tension detecting portions 150. Accordingly, the control of the tension of the plurality of fiber bundles F can be easily made.

The fiber bundle head in the hoop winding device 30 of the FW device 100 is the wrapping table 34 rotatably installed around the outer circumference of the liner 1, and the wrapping table 34 rotates about the axis of the liner 1 and transfers in the axial direction, thereby simultaneously winding the plurality of fiber bundles F supplied from the bobbins BA, BB, BC, and BD on the liner 1. Accordingly, the first tension adjusting portion 110 and the first unreeling failure detecting portions 130 can be easily arranged in the wrapping table 34 of the hoop winding device 30.

The first unreeling failure detecting portions 130 of the FW device 100 are individually provided for the plurality of bobbins BA, BB, BC, and BD and include the first detection piece 67 that changes from the standby position to the detection position, upon reception of the tension of the fiber bundles F unreeled, and the first detection portion 68 that detects that the first detection piece 67 is positioned at the detection position. Accordingly, the first unreeling failure detecting portions 130 can be constituted based on simple constitution, and the unreeling failure on the bobbins BA, BB, BC, and BD can be detected with high accuracy.

The first detection piece 67 of the first unreeling failure detecting portions 130 of the FW device 100 is biased by the torsional spring and positioned at the standby position. Accordingly, with simple constitution, the unreeling failure on the bobbins BA, BB, BC, and BD can be detected with high accuracy.

The first detection portions 68 of the first unreeling failure detecting portions 130 of the FW device 100 are the photoelectric sensors that are individually provided corresponding to the first detection pieces 67. Accordingly, it is possible to steadily determine on which bobbin, out of the bobbins BA, BB, BC, and BD, the unreeling failure occurs or whether or not the unreeling failure occurs.

Second Embodiment

Next, the second embodiment of the present invention will be described. In the present embodiment, a second tension adjusting portion 210, a second unreeling failure detecting portion 230, and a second tension detecting portion 250 are provided for the helical winding device 40. First, the schematic constitution of these portions will be described.

Figure 8:
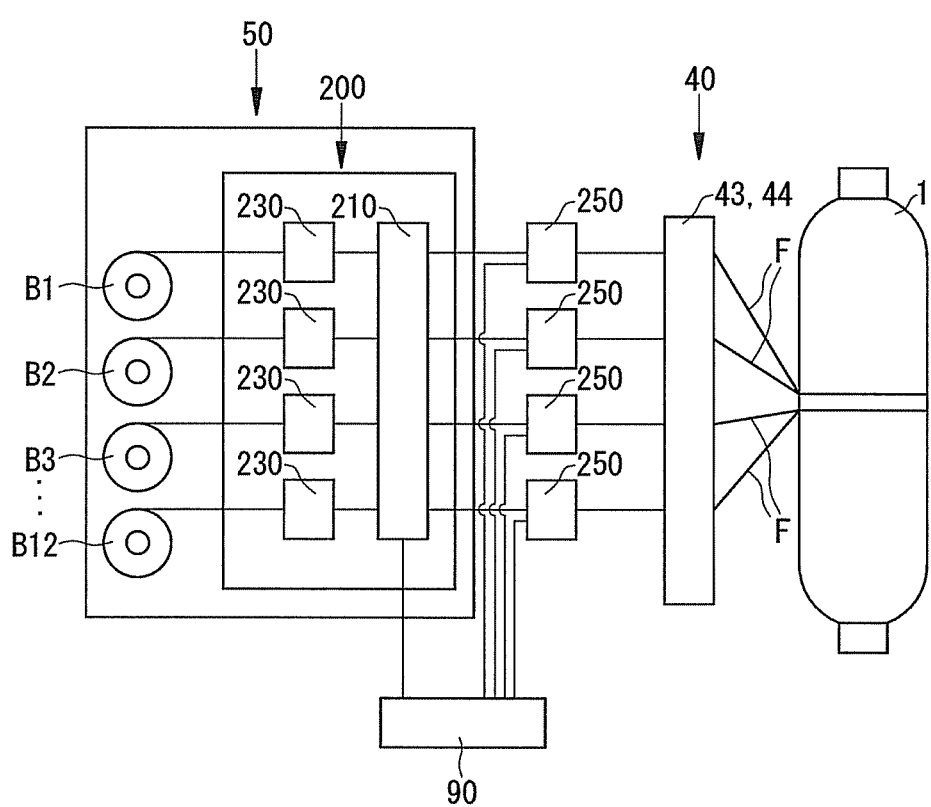
FIG. 8 is a view illustrating the schematic constitution of a second tension adjusting portion 210, a second unreeling failure detecting portion 230, and a second tension detecting portion 250, each of which is provided for a helical winding device 40.

As illustrated in FIG. 8, the second tension adjusting portion 210, the second unreeling failure detecting portions 230, and the second tension detecting portions 250 are arranged on the yarn paths leading from the plurality of bobbins B1, B2, . . . to the first helical head 43 and the second helical head 44. In the present embodiment, 180 bobbins B1, B2, . . . and B180 are divided into 15 bobbin groups G1, G2, and G15, and each of the bobbin groups G1, G2, . . . and G15 has 12 bobbins B1, B2, . . . , for which the second tension adjusting portion 210, the second unreeling failure detecting portions 230, and the second tension detecting portions 250 are provided. Hereinafter, an example will be described in which the bobbin group G1 made up of 12 bobbins B1, B2, . . . and B12 is exemplified.

As illustrated in FIG. 8, in the present embodiment, the second tension adjusting portion 210 and the second unreeling failure detecting portions 230 are constituted as one unit of tension device 200. The second tension adjusting portion 210 is provided for common use with respect to the plurality of fiber bundles F unreeled from the plurality of bobbins B1, B2, . . . and B12. The second tension adjusting portion 210 collectively adjusts the tension of the plurality of fiber bundles F. The second tension adjusting portion 210 is electrically connected to the controller 90, and the drive of the second tension adjusting portion 210 is controlled by the controller 90.

The second tension detecting portions 250 are provided between the first helical head 43 and the second helical head 44 and the second tension adjusting portion 210. The second tension detecting portions 250 are individually provided for the plurality of fiber bundles F. The second tension detecting portions 250 individually detect the tension of the plurality of fiber bundles F. The second tension detecting portions 250 detect the tension of each fiber bundle F and transmit the detection signal to the controller 90. The controller 90 controls the drive of the second tension adjusting portion 210 based on the detection signal from the second tension detecting portions 250. The second tension adjusting portion 210 collectively adjusts the tension of the plurality of fiber bundles F in accordance with the detection results of the second tension detecting portions 250.

The second unreeling failure detecting portions 230 individually detect the unreeling failure of the fiber bundles F on the plurality of bobbins B1, B2, . . . and B12 for each of the bobbins B1, B2, . . . and B12. The second unreeling failure detecting portions 230 are provided on the yarn paths between the plurality of bobbins B1, B2, . . . and B12 and the second tension adjusting portion 210.

Figure 9:
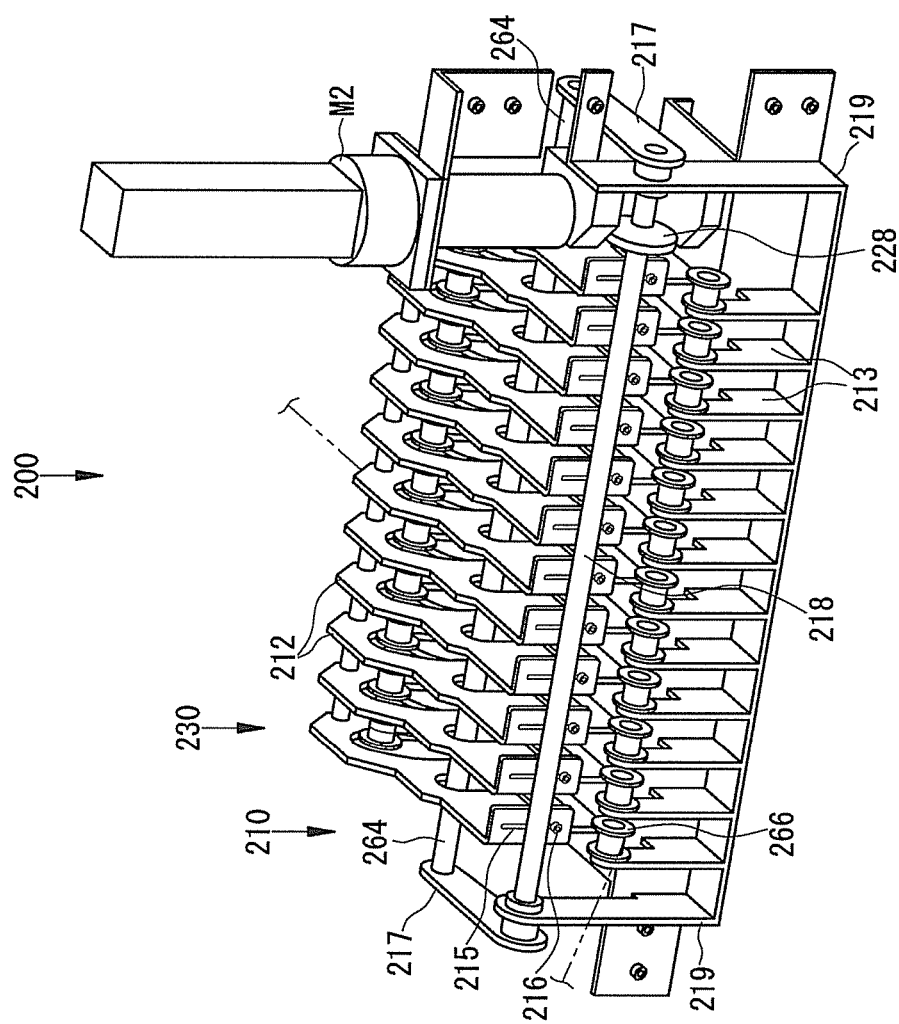
FIG. 9 is a perspective view of a tension device 200.
Figure 10:
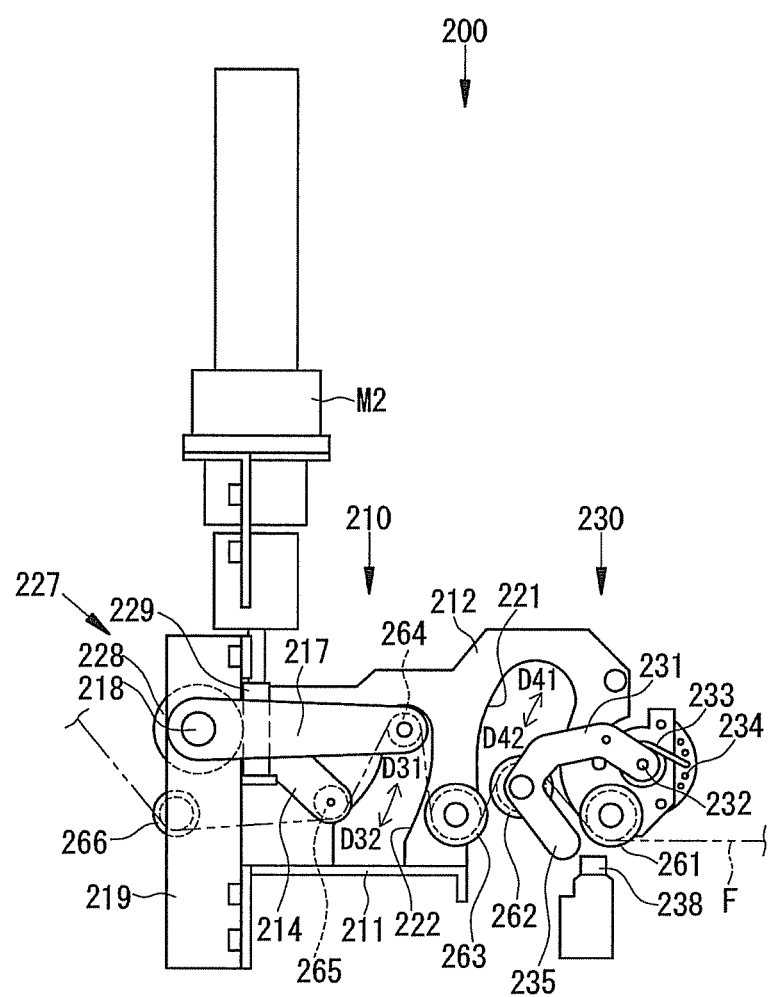
FIG. 10 is a side view of the tension device 200.
Figure 11:
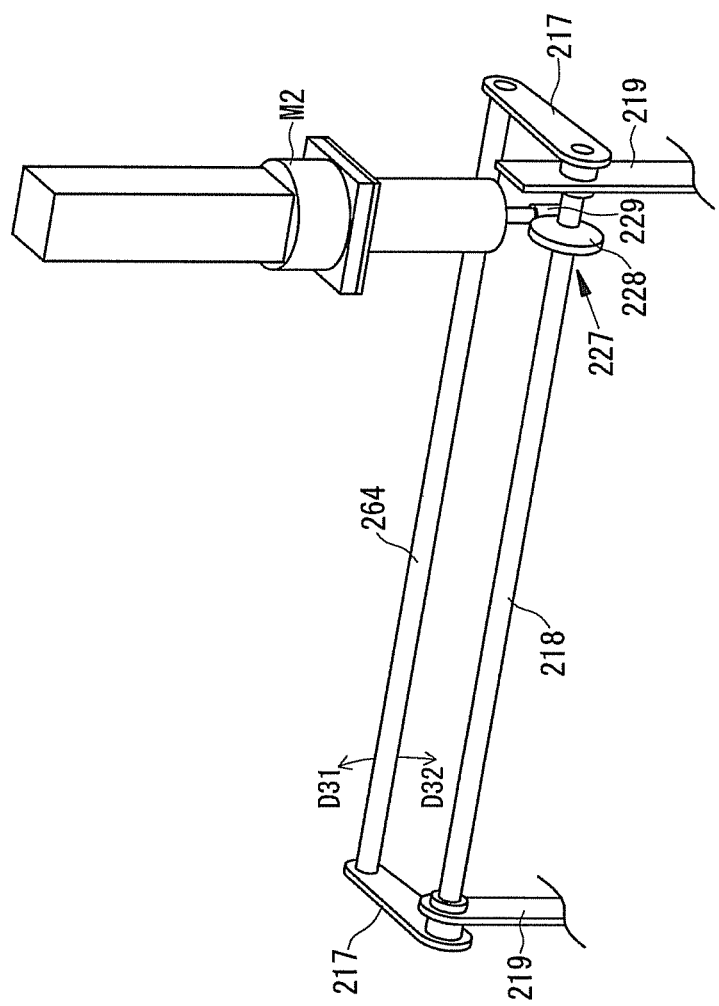
FIG. 11 is a simplified schematic view illustrating a mechanism that allows a fourth shaft 264 to swing.

Subsequently, the specific constitution of the second tension adjusting portion 210, the second unreeling failure detecting portion 230, and the second tension detecting portion 250 will be described. As illustrated in FIGS. 9 to 11, the second tension adjusting portion 210 and the second unreeling failure detecting portions 230 are constituted as one unit of tension device 200. The position at which the tension device 200 is arranged, for example, may be placed on the creel stand 50 as illustrated in FIG. 8, but not limited to this. In the present embodiment, 15 units of tension devices 200 are provided in accordance with the 15 bobbin groups G1, G2, . . . and G15. Fifteen units of tension devices 200 have the same constitution.

As illustrated in FIG. 8, the tension device 200 is provided in such a manner as to be interposed on the paths of the fiber bundles F leading from the plurality of bobbins B1, B2, . . . and B12 to the first helical head 43 and the second helical head 44. As illustrated in FIGS. 9 and 10, the tension device 200 includes a first frame 211 that serves as a base. Twelve sets of second frames 212 and third frames 213 are arranged side by side on the first frame 211 in accordance with the fiber bundles F from the 12 bobbins B1, B2, . . . and B12. The respective first supporting portions 214 are provided for the second frames 212.

A first roller 261 is provided at the one end of each second frame 212, and a third roller 263 is provided at approximately the central position of each second frame 212. The first roller 261 is a roller constituting the second unreeling failure detecting portion 230. The third roller 263 is a roller that is common to the second tension adjusting portion 210 and the second unreeling failure detecting portion 230. A first notch portion 221 is formed between the first roller 261 and the third roller 263. The first notch portion 221 is a notch portion that secures space in which a second roller 262 constituting the second unreeling failure detecting portion 230 swings. A second notch portion 222 is formed on the opposite side to the first notch portion 221 with respect to the third roller 263. The second notch portion 222 is a notch portion that secures space in which a fourth shaft 264 constituting the second tension adjusting portion 210 swings. In a state where the 12 second frames 212 are provided on the first frame 211, the first notch portion 221 and the second notch portion 222 of each second frame 212 are provided as a contiguous space in the direction in which the 12 second frames 212 are traversed.

The second tension adjusting portion 210 collectively adjusts the tension of 12 fiber bundles F unreeled from the plurality of bobbins B1, B2, . . . and B12. The second tension adjusting portion 210 includes the third rollers 263, the fourth shaft 264, a fifth shaft 265, and sixth rollers 266. Regarding the second tension adjusting portion 210, the fiber bundles F are wound around in order of the third rollers 263, the fourth shaft 264, the fifth shaft 265, and the sixth rollers 266. The third rollers 263 are rollers that receive the fiber bundles F guided from the side of the plurality of bobbins B1, B2, . . . and B12 via the second unreeling failure detecting portions 230 to the second tension adjusting portion 210. The sixth rollers 266 are rollers that forward the fiber bundles F to the side of the first helical head 43 or the side of the second helical head 44. The sixth rollers 266 are supported by the third frames 213.

The fifth shaft 265 is supported by the first supporting portions 214. As illustrated in FIG. 9, the fixation of the first supporting portions 214 on the second frames 212 is carried out by elongated holes 215 and bolts 216 formed on the second frames 212. The fixed positions with the bolts 216 are changed, thereby changing the positions of the first supporting portions 214 with respect to the second frames 212. Accordingly, the position of the fifth shaft 265 is adjusted, thereby adjusting the tension of the fiber bundles F.

The fourth shaft 264 is one member corresponding to the 12 fiber bundles F and arranged in such a manner as to penetrate a space formed by the second notch portions 222 of 12 second frames 212. As illustrated in FIG. 9, the both end portions of the fourth shaft 264 are supported by one end portions of two arms 217. The other end portions of the two awls 217 are connected to a supporting shaft 218. The both end portions of the supporting shaft 218 are swingably supported by second supporting portions 219 erected on the both sides of the first frame 211. Accordingly, the fourth shaft 264 is provided in such a manner as to be swingable in the direction of D31 and the direction of D32, centering on the supporting shaft 218 (see FIG. 10). The direction of D31 is the direction in which the fourth shaft 264 is separated away from the third roller 263 and the fifth shaft 265. The direction of D32 is the direction in which the fourth shaft 264 comes close to the third roller 263 and the fifth shaft 265. The swing of the fourth shaft 264 changes the paths of the fiber bundles F leading from the third rollers 263 to the fifth shaft 265, which changes the frictional force acted on the fiber bundles F, so that the tension of the fiber bundles F can be adjusted. When the fourth shaft 264 transfers in the direction of D31, the tension applied to the fiber bundles F increases. When the fourth shaft 264 transfers in the direction of D32, the tension applied to the fiber bundles F decreases.

As illustrated in FIGS. 10 and 11, a worm wheel 228 constituting a worm gear 227 is fixed in the periphery of one end portion of the supporting shaft 218. The worm wheel 228, the arm 217, the supporting shaft 218 and the fourth shaft 264 can be rotated as a unit.

A second motor M2 is provided above the worm wheel 228. A servomotor is used as the second motor M2. A worm 229 constituting the worm gear 227 is fixed on the driving shaft of the second motor M2. The worm gear 227 is constituted by engaging the worm 229 with the worm wheel 228. The second motor M2 is electrically connected to the controller 90, and the drive of the second motor M2 is controlled by the controller 90. The rotation angle of the second motor M2 is controlled by the controller 90, thereby changing the swing angle in the direction of D31 or in the direction of D32 of the arm 217 and the fourth shaft 264 and adjusting the tension of the fiber bundles F.

It is noted that the tension of the fiber bundles F acts upon the fourth shaft 264, which causes the arm 217 and the fourth shaft 264 to receive the rotating force in the direction of D32 (see FIG. 10). This force is transmitted from the worm wheel 228 to the worm 229. However, in general, with regard to the worm gear, when the rotation force acts upon the side of the worm wheel, the worm exerts the effect of serving as a whirl-stop. Accordingly, in the present embodiment, the worm gear 227 is provided between the second motor M2 and the fourth shaft 264, which makes it unnecessary to separately provide the whirl-stop mechanism of the arm 217 and the fourth shaft 264. Also, the rotation force from the arm 217 is not transmitted as a force that reverses the driving shaft of the second motor M2, so that a relatively small-size motor can be used as the second motor M2.

The second tension detecting portions 250 are individually arranged for the plurality of fiber bundles F and individually detect the tension of each fiber bundle F. The second tension detecting portions 250 are provided in such a manner as to be interposed on the paths of the fiber bundles F leading from the second tension adjusting portion 210 of the tension device 200 to the first helical head 43 or the second helical head 44. The second tension detecting portions 250 detect the tension of each fiber bundle F and transmit the detection signal to the controller 90. The controller 90 controls the drive of the second tension adjusting portion 210 based on the detection signal from the second tension detecting portions 250.

Specifically, when the tension of the fiber bundles F is lower than a predetermined value, the second tension detecting portion 250 transmits a detection signal to the effect that the tension is lower than the predetermined value to the controller 90. In this case, the controller 90 controls the rotation angle of the second motor M2 based on the detection signal from the second tension detecting portion 250 in such a manner that the fourth shaft 264 provided in the arm 217 is transferred in the direction of D31, and that the tension of fiber bundles F increases. Also, when the tension of the fiber bundles F is higher than a predetermined value, the second tension detecting portion 250 transmits a detection signal to the effect that the tension is higher than the predetermined value, to the controller 90. In this case, the controller 90 controls the rotation angle of the second motor M2 based on the detection signal from the second tension detecting portion 250 in such a manner that the fourth shaft 264 provided in the arm 217 is transferred in the direction of D32, and that the tension of fiber bundles F decreases. With the above-mentioned constitution, the second tension adjusting portion 210 can collectively adjust the tension of the plurality of fiber bundles F in accordance with the detection results of the second tension detecting portions 250.

As illustrated in FIGS. 9 and 10, the respective second unreeling failure detecting portions 230 constituting the tension device 200 are provided for the 12 second frames 212. The respective second unreeling failure detecting portions 230 are provided at positions interposed on the paths of the fiber bundles F leading from the bobbins B1, B2, ... and B12 to the second tension adjusting portion 210. The second unreeling failure detecting portions 230 corresponding to the bobbins B1, B2, ... and B12 have approximately the same constitution, and hereinafter, the second unreeling failure detecting portion 230 corresponding to the bobbin B1 will be mainly described.

As illustrated in FIGS. 9 and 10, the second unreeling failure detecting portion 230 includes a first roller 261, a second roller 262, and a third roller 263. The fiber bundle F is wound round in order of the first roller 261, the second roller 262, and the third roller 263. The first roller 261 is a roller that receives the fiber bundle F unreeled from the bobbin B1. The third roller 263 is a roller that is common to the second tension adjusting portion 210.

The second roller 262 is supported by an arm 231. The arm 231 is bent in an approximately U shape, and the second roller 262 is supported in the periphery of the bent portion. One end portion of the arm 231 is provided in the second frame 212 in such a manner as to be swingable in the direction of D41 and in the direction of D42, centering on a supporting shaft 232. The direction of D41 is the direction in which the second roller 262 is separated away from the first roller 261 and the third roller 263. The direction of D42 is the direction in which the second roller 262 comes close to the first roller 261 and the third roller 263. That is, the arm 231 swings, thereby increasing and decreasing the length of the path of the fiber bundle F between the first roller 261 and the third roller 263.

The arm 231 is biased by a torsional spring 233 provided in the supporting shaft 232 in the direction (the direction of D41) in which the second roller 262 is separated away from the first roller 261 and the third roller 263. It is noted that a plurality of holes 234 for fixing the end portion of the torsional spring 233 are provided in the second frame 212. The biased force of the arm 231 can be adjusted by changing the positions of the holes 234 for fixing the end portion of the torsional spring 233.

The other end portion of the arm 231 serves as a second detection piece 235. The second detection piece 235 swings in response to the swing of the arm 231. A second detection portion 238 is provided in the vicinity of the arm 231.

When the predetermined tension is applied to the fiber bundle F, that is, when the unreeling of the fiber bundle F on the bobbin B1 is normal, the second roller 262 is biased by the biased force of the torsional spring 233 provided in the supporting shaft 232 of the arm 231, and the arm 231 is rotated in the direction of D41 and rotated in the direction in which the arm 231 is rotated is separated away from the first roller 261 and the third roller 263. When the tension applied to the fiber bundle F is increased, compared with the predetermined tension, that is, when there occurs abnormality in unreeling the fiber bundle F on the bobbin B1, the second roller 262 is pressed against the biased force of the torsional spring 233 provided in the supporting shaft 232 of the arm 231, and the arm 231 is rotated in the direction of D42, and rotated in the direction in which the arm 231 comes close to the first roller 261 and the third roller 263.

The second detection portion 238 detects the second detection piece 235, thereby detecting that the arm 231 is rotated to a predetermined position. Also, when the second detection portion 238 does not detect the second detection piece 235, the second detection portion 238 detects that the arm 231 is not rotated to the predetermined position. That is, the second detection portion 238 detects that the unreeling of the fiber bundle F on the bobbin B1 is normal, and the predetermined tension is applied to the fiber bundle F, and detects that the failure occurs in unreeling the fiber bundle F on the bobbin B1, and the tension applied to the fiber bundle F is being increased.

When the second detection portion 238 detects that the failure occurs in unreeling the fiber bundle F on the bobbin B1, the second detection portion 238 transmits the detection signal to the effect that the failure occurs, to the controller 90. Also, when the second detection portion 238 detects that the unreeling of the fiber bundle F on the bobbin B1 is normal, the second detection portion 238 transmits the detection signal to the effect that the unreeling is normal, to the controller 90. As the second detection portion 238, known sensors such as a photoelectric sensor can be used.

When the second detection portion 238 detects that the failure occurs in unreeling the fiber bundle F on the bobbin B1, the controller 90 generates an alarm sound or the like by means of a notification portion not illustrated, based on the detection signal from the second detection portion 238. It is noted that there is a case where, even when the failure does not occur in unreeling the fiber bundle F on the bobbin B1, the tension applied to the fiber bundle F is temporarily increased due to an increase in the winding velocity of the fiber bundle F immediately after the helical winding device 40 starts winding the fiber bundle F. In this case, it is not necessary to exert the alarm sound or the like. Accordingly, the controller 90 does not exert the alarm sound or the like when a duration time of an abnormality detection signal from the second detection portion 238 is equal to or less than a set time. Also, even when the duration time of the abnormality detection signal from the second detection portion 238 is equal to or less than a set time, but when the abnormality detection signals are received at a predetermined frequency or higher, the controller 90 determines that some abnormality occurs and exerts the alarm sound or the like.

It is noted that the above-mentioned second detection portions 238 are each provided for 12 sets of second unreeling failure detecting portions 230, but not limited to this. For example, one second detection portion 238 may be installed in the direction in which the 12 second frames 212 are traversed. In this case, when the second detection piece 235 of any second unreeling failure detecting portion 230, out of 12 sets of second unreeling failure detecting portions 230, is detected, the occurrence of the unreeling failure on any of the bobbins B1, B2, . . . and B12 can be detected. Also, when the photoelectric sensor is used as the second detection portion 238, it cannot be determined what second detection piece 235 is detected based on what second unreeling failure detecting portion 230, which makes it impossible to specify a bobbin on which the unreeling failure occurs. Accordingly, in place of the photoelectric sensor as the second detection portion 238, a laser distance sensor that can measure a distance to a light-shielding position can be used as the second detection portion 238. In this case, positional information on the second detection piece 235 detected can be obtained, and the second detection piece 235 detected can be specified, so that the bobbin on which the unreeling failure occurs can be specified.

According to the above-mentioned FW device 100 of the present embodiment, the following advantageous effects are provided.

According to the FW device 100, the FW device 100 includes the second tension adjusting portion 210 that collectively adjusts the tension of the plurality of fiber bundles F unreeled from the plurality of bobbins B1, B2, . . . and B12 and the second unreeling failure detecting portions 230 that individually detect the unreeling failure for each of the bobbins B1, B2, . . . and B12. Accordingly, the second tension adjusting portion 210 and the second unreeling failure detecting portions 230 are miniaturized, and the cost of the second tension adjusting portion 210 and the second unreeling failure detecting portions 230 can be reduced, and the second tension adjusting portion 210 and the second unreeling failure detecting portions 230 can be easily arranged. Also, the second tension adjusting portion 210 can collectively adjust the tension of the plurality of fiber bundles F, so that the control of the tension of the plurality of fiber bundles F can be easily made.

According to the FW device 100, the second unreeling failure detecting portions 230 are provided on the yarn paths between the second tension adjusting portion 210 and the plurality of bobbins B1, B2, . . . . The variation of the tension of the fiber bundles F, which is detected by the second unreeling failure detecting portions 230, is attributed to the unreeling failure on the bobbins B1, B2, . . . , and the variation of the tension due to the operational failure of the second tension adjusting portion. 210 and the like is not included. Accordingly, the variation of the low tension due to the unreeling failure on the bobbins B1, B2, . . . can be detected, and the unreeling failure on the bobbins B1, B2, . . . can be detected with high accuracy.

According to the FW device 100, the second tension detecting portions 250 that detect the tension of the plurality of fiber bundles F are provided between the liner 1 and the second tension adjusting portion 210, and the second tension adjusting portion 210 collectively adjusts the tension of the plurality of fiber bundles F in accordance with the detection results of the second tension detecting portions 250. Accordingly, the control of the tension of the plurality of fiber bundles F can be easily made.

According to the FW device 100, the fiber bundle head is the first helical head 43 and the second helical head 44 that are installed around the outer circumference of the liner 1, and the liner 1 transfers in the axial direction while rotating about the axis thereof, thereby simultaneously winding the plurality of fiber bundles F supplied from the bobbins B1, B2, . . . on the liner 1. Accordingly, the second tension adjusting portion 210 and the second unreeling failure detecting portions 230 can be easily arranged in the FW device 100 that includes the first helical head 43 and the second helical head 44 of the helical winding device 40.

According to the FW device 100, the second unreeling failure detecting portions 230 are individually provided for the plurality of bobbins B1, B2, . . . and include the second detection piece 235 that changes from the standby position to the detection position, upon reception of the tension of the fiber bundles F unreeled, and the second detection portion 238 that detects that the second detection piece 235 is positioned at the detection position. Accordingly, the second unreeling failure detecting portions 230 can be constituted based on simple constitution, and the unreeling failure on the bobbins B1, B2, . . . can be detected with high accuracy.

According to the FW device 100, the second detection piece 235 of the second unreeling failure detecting portion 230 is biased by the torsional spring 233 and positioned at the standby position. Accordingly, with simple constitution, the unreeling failure on the bobbins B1, B2, . . . can be detected with high accuracy.

Thus, the embodiments of the present invention have been described. However, the present invention is not limited to the above-mentioned embodiments, but various modifications can be applied.

INDUSTRIAL APPLICABILITY

The filament winding device of the present invention can miniaturize the tension adjusting portion and the unreeling failure detecting portion, reduce the cost of the tension adjusting portion and the unreeling failure detecting portion, and arrange the tension adjusting portion and the unreeling failure detecting portion in an easy manner, which is industrially useful.

REFERENCE SIGNS LIST

100 Filament winding device
10 Main base
20 Liner transfer device
30 Hoop winding device
34 Wrapping table
40 Helical winding device
43 First helical head
44 Second helical head
50 Creel stand
1 Liner
B Bobbin F Fiber bundle
110 First tension adjusting portion
130 First unreeling failure detecting portion
150 First tension detecting portion
210 Second tension adjusting portion
230 Second unreeling failure detecting portion
250 Second tension detecting portion
67 First detection piece
68 First detection portion
235 Second detection piece
238 Second detection portion

The invention claimed is:

1. A filament winding device configured to include a fiber bundle head that allows a plurality of fiber bundles supplied from a plurality of bobbins to face an outer circumference of a liner and configured to simultaneously wind the plurality of fiber bundles on the liner by relatively rotating the fiber bundle head and the liner, centering on an axis of the liner, the filament winding device comprising:
   a tension adjusting portion configured to collectively adjust tension of the plurality of fiber bundles unreeled from the plurality of bobbins; and
   an unreeling failure detecting portion configured to individually detect unreeling failure of the fiber bundles on the bobbins for each bobbin,
   wherein the unreeling failure detecting portions are configured to be individually provided in accordance with the plurality of bobbins and configured to include a detection piece configured to change from a standby position to a detection position, upon reception of the tension of the fiber bundle unreeled, and a detection portion configured to detect that the detection piece is positioned at the detection position.

2. The filament winding device according to claim 1, wherein the unreeling failure detecting portion is configured to be provided on a yarn path between the tension adjusting portion and the plurality of bobbins.

3. The filament winding device according to claim 1, further comprising a tension detecting portion configured to be provided between the liner and the tension adjusting portion and configured to detect the tension of the plurality of fiber bundles,
   wherein the tension adjusting portion is configured to collectively adjust the tension of the plurality of fiber bundles in accordance with a detection result of the tension detecting portion.

4. The filament winding device according to claim 1, wherein the fiber bundle head is a helical winding head installed around an outer circumference of the liner, and the liner transfers in an axial direction while rotating about an axis thereof, thereby simultaneously winding the plurality of fiber bundles supplied from the bobbins on the liner.

5. The filament winding device according to claim 1, wherein the fiber bundle head is a hoop winding head rotatably installed around the outer circumference of the liner, and
   wherein the hoop winding head transfers in the axial direction while rotating about the axis of the liner, thereby simultaneously winding the plurality of fiber bundles supplied from the bobbins on the liner.

6. The filament winding device according to claim 1, wherein the detection piece is biased by a spring and positioned at the standby position.

7. The filament winding device according to claim 1, wherein the detection portion is a laser distance sensor that can measure a distance to a light-shielding position.

8. The filament winding device according to claim 1, wherein the detection portion is a photoelectric sensor that is individually provided in accordance with each detection piece.

* * * * *